United States Patent [19]

Kirschner, Jr. et al.

[11] Patent Number: 4,817,377
[45] Date of Patent: Apr. 4, 1989

[54] HEAD END CONTROL AND STEERING SYSTEM: USING A FORWARD END MANEUVERING GAS GENERATOR

[75] Inventors: Thomas J. Kirschner, Jr., Northeast, Md.; John J. Walsh, Wilmington, Del.

[73] Assignee: Morton Thiokol, Inc., Chicago, Ill.

[21] Appl. No.: 47,755

[22] Filed: May 7, 1987

[51] Int. Cl.⁴ .......................... F02K 9/00; F02K 1/00
[52] U.S. Cl. .......................... 60/225; 60/229; 60/250; 60/253
[58] Field of Search .................. 60/225, 250, 227, 228, 60/229, 244, 245, 253, 203; 102/374; 244/3.22

[56] References Cited

U.S. PATENT DOCUMENTS

| | | | |
|---|---|---|---|
| 3,316,719 | 5/1967 | Loprete | 60/250 |
| 3,328,962 | 7/1967 | DeFeo et al. | 60/225 |
| 3,349,562 | 10/1967 | Williams et al. | 60/253 |
| 3,349,563 | 10/1967 | Taylor et al. | 60/225 |
| 3,442,084 | 5/1969 | Dilchert et al. | 60/250 |
| 3,532,297 | 10/1970 | Maes | 60/229 |
| 4,355,663 | 10/1982 | Burkes, Jr. et al. | 60/253 |
| 4,681,283 | 7/1987 | Kranz | 244/3.22 |
| 4,689,845 | 9/1987 | Stessen | 60/228 |
| 4,726,544 | 2/1988 | Unterstein | 244/3.22 |

*Primary Examiner*—Louis J. Casaregola
*Assistant Examiner*—Timothy S. Thorpe
*Attorney, Agent, or Firm*—Gerald K. White

[57] ABSTRACT

An auxiliary gas generator is used to provide gas for steering and pointing control of a multi-stage rocket motor system to a head or forward end located final interception maneuvering stage. During lower stage operation, this gas is routed through the "Divert" thrusters of the final interception stage through a check valve. When control is not required, the gas can be either dumped through all thrusters or all thrusters can be closed and the gas dumped into the lower stages. As each of the lower stages is burned out, it is discarded. Using one or more gas generating propellant packages provided therein, the final interception stage maneuvers to the target.

10 Claims, 1 Drawing Sheet

U.S. Patent  Apr. 4, 1989  4,817,377
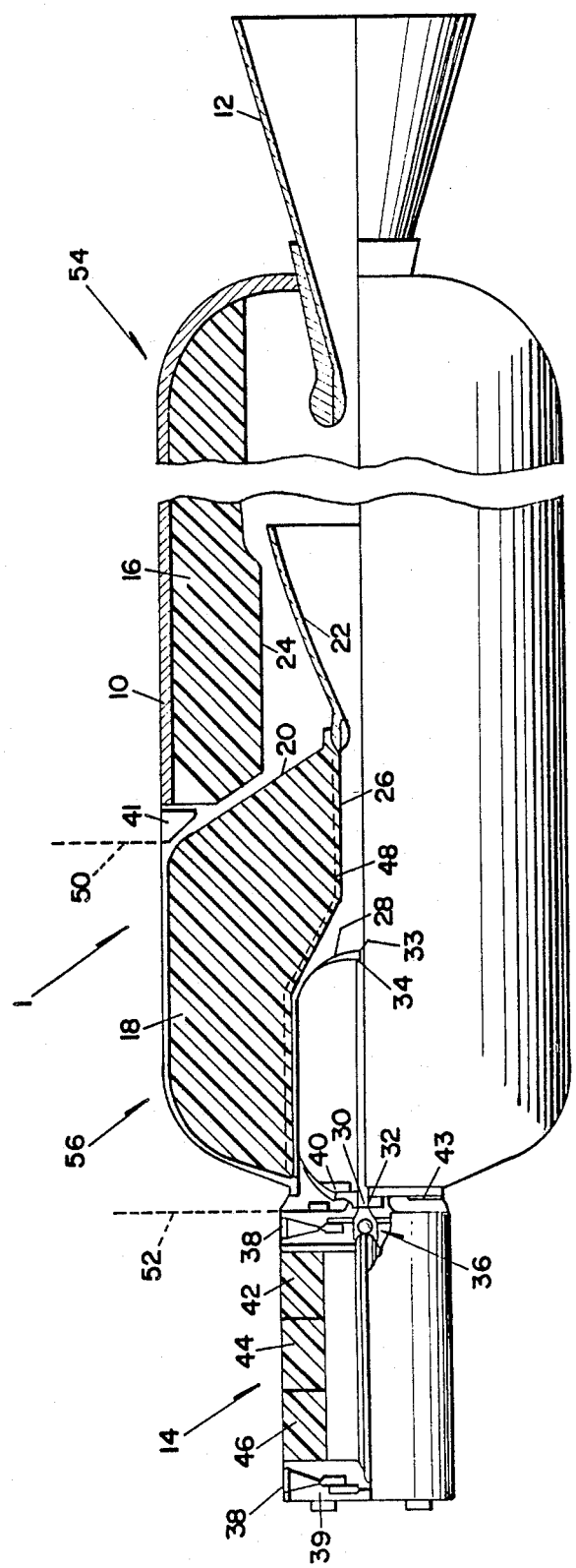
Fig. 1
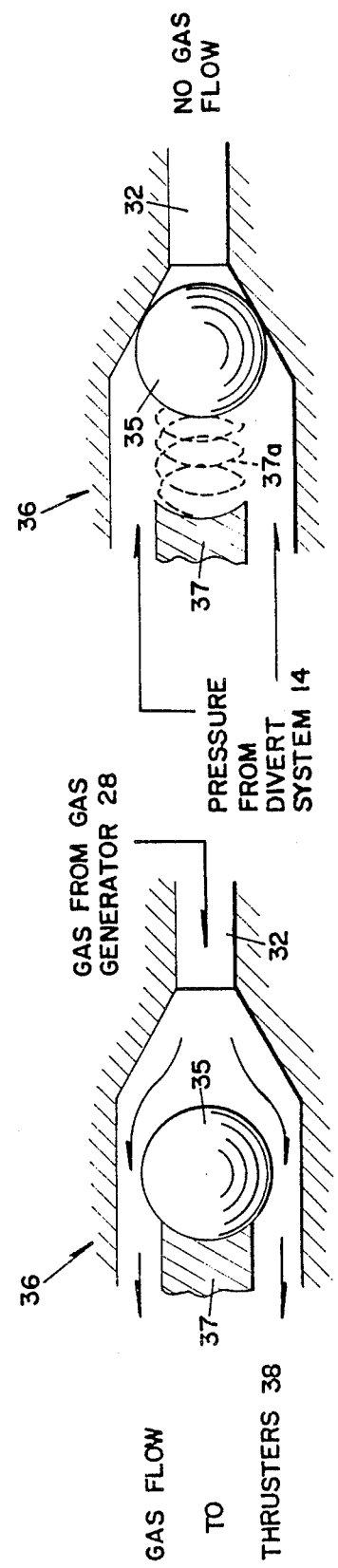
Fig. 2
Fig. 3

HEAD END CONTROL AND STEERING SYSTEM: USING A FORWARD END MANEUVERING GAS GENERATOR

BACKGROUND OF THE INVENTION

1. Field of the Invention

The present invention relates to rocket motors. More particularly, the invention relates to the upper stages of a rocket motor system wherein a forward end maneuvering stage is utilized to provide steering and pointing control and ignition, and control of the lower stages.

2. Description of the Prior Art

There is a need for greater control with respect to direction, velocity, and attitude of multi-stage solid propellant rocket motors while at the same time effecting a reduction in system complexity and improving the overall mass fraction. "Mass fraction" is the ratio of the mass of the propellant grain in a rocket motor case to the total mass that could be put in the case if it were completely filled.

The need for such greater control is particularly true of the upper stages of ballistic missiles, the trajectory of which must be corrected to insure accuracy in delivery of the payload, or in multi-stage rocket weapons requiring final intercept maneuvering to counteract evasive movements of the target.

Devices for controlling the direction, velocity and attitude of such upper stages of a rocket motor usually require controlling the flow of gases therethrough by means of valves. In the prior art this has required a special source of gas because high energy or "energetic" propellants that are conventionally used for rocket propulsion produce very high temperatures, and in addition, the gases are corrosive so that they tend to erode, decompose or otherwise render valves inoperative.

Thus, as disclosed in U.S. Pat. No. 3,724,217 granted to Allan J. McDonald on Apr. 3, 1973 and assigned to the assignee of the present invention, there is provided an auxiliary gas generator for supplying gas to control devices for controlling the attitude and direction of a rocket system. Specifically, a solid propellant rocket motor that is extinguishable is coupled by means of pipes and valves with a gas generator that is also extinguishable, and in addition, reignitable. The rocket motor has a forward grain in a top stage and an aft grain in a bottom stage, said grains being in abutting relationship with a central perforation extending the length of the grains. The top stage forward grain is much less energetic than the bottom stage aft grain and produces relatively cool, clean gas that is similar to that produced by the gas generator and which may be valved safely into the attitude and direction control devices. Gas from the gas generator may flow through the rocket motor and gas from the rocket motor may flow to the gas generator depending upon the positions of the valves. Either the gas generator or the rocket motor may contribute, singly or in combination, to propulsion of the rocket system or to operation of the control devices thereof.

Additionally, either the gas generator or the rocket motor can reignite the other. They can both be inoperative at the same time and can b ignited by the igniter of the gas generator.

Since high temperature corrosive gases cause valves to deteriorate, energetic propulsive gases cannot be used as the top stage forward grain in the rocket system of U.S. Pat. No. 3,724,217. Also, he pipe and valve arrangement coupling the gas generator and rocket motor is complex. Additionally, the rocket motor and gas generator remain coupled for the entire flight thus detracting from the mass fraction.

Thus, there exists a need and a demand for improvement in apparatus employed in the prior art for controlling and steering multi-stage rocket motor systems to the end of enabling energetic propellants to be used in the top stage of such systems, if desired or required, while at the same time achieving significant reduction in system complexity and improvement in the overall mass fraction. The present invention was devised to fill the technological gap that has existed in the art in these respects.

SUMMARY OF THE INVENTION

An object of the invention is to provide an improved apparatus enabling head end control and steering of a multi-stage rocket system using a forward end maneuvering gas generator.

Another object of the invention is to provide such an improved apparatus whereby a forward end maneuvering stage or section of the rocket system may be used to provide steering and pointing control, ingnition and control of the lower stages including repointing during operation of the lower stages without using the propellant provided therein.

Still another object of the invention is to provide such an improved apparatus in which the gas source used to provide steering and pointing control, ignition and control of the lower stages of the rocket system is a separate gas generator located inside the top or second stage and in which the top stage propellant may be either metallized to make it energetic, or unmetallized.

In accomplishing these and other objectives, the invention uses the final stage homing interception, maneuvering or "Divert" stage of a multi-stage rocket motor system to provide steering and control during the operation of the lower stages. Specifically, the system uses an auxiliary gas generator located in the top stage to provide gas for steering and pointing control to a head or forward end located final maneuvering stage in which command means or mechanism for the rocket motor system is provided.

During lower stage operation, the gas is routed through maneuvering stage thruster nozzles through a check valve. When control is not required, the generated gas can either be dumped through all of the thruster nozzles or all of the thruster nozzles can be closed and the gas dumped into the lower stages.

A feature of the invention is the provision of excess gas generating capacity in the auxiliary gas generator whereby high temperature corrosive gases produced in the lower stages are prevented from flowing through and damaging the check valve.

As each of the lower stages is burned out, it is separated from the maneuvering stage, and using gas generators provided therein, the maneuvering stage maneuvers under control of the command mechanism located therein to the target.

Upon ignition of the auxiliary gas generator, gas is supplied to the maneuvering stage thruster nozzles through the check valve, the pressure of the generated gas opening the check valve. The thrust produced by the thruster nozzles is used to point the rocket system at the target. Thus, the invention provides pointing capability before ignition of any of the lower stages of the rocket system.

Upon closure of the thruster nozzles in the maneuvering stage, pressure builds up in the auxiliary gas generator and bursts a disk. This allows hot generated gas under pressure to flow into the top and bottom stages, igniting the rocket motor.

In accordance with the invention, the propellant grain in the top or second stage has a "slow burn rate" layer on the surface exposed to the igniting flame while the propellant grain in the bottom or first stage has a "high burn rate." As a result, the propellant grain in the bottom stage burns out before the slow burn propellant layer on the top stage propellant burns through. During bottom or first stage operation, the thruster nozzles in the maneuvering stage can act as a thrust vector control system, either maintaining the pointing direction or changing the pointing direction as the target maneuvers.

Upon burnout of the propellant in the first stage, the pressure in the rocket motor drops. The first stage of the rocket motor is then separated from the second stage and jettisoned. The slow burn propellant layer acts as a time delay mechanism, delaying ignition of the second stage propellant grain.

After first stage burnout, the thruster nozzles can be used to change the pointing direction or retarget the second stage during a period in which the rocket motor system is coasting before ignition of the second stage. The coasting period ends upon burn through of the slow burn rate layer on the second stage propellant.

During second stage burning, the thruster nozzles in the maneuvering stage can act as a thrust vector control system, again either maintaining pointing direction or changing the velocity vector as the target maneuvers.

After second stage burnout, the maneuvering stage is separated from the second stage, with the latter being jettisoned. Gas pressure for providing direction, attitude, and sidewise thrust is provided by propellant packages provided in the maneuvering stage. Build up of such pressure in the maneuvering stage effects immediate closure of the check valve with the pressure interior of the maneuvering stage now being greater than that exterior thereof.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWING

With this description of the invention, a detailed description follows with reference being made to the accompanying figures of drawing which form part of the specification and of which:

FIG. 1 comprises a fragmentary longitudinal section of the rocket system according to the invention with some parts being schematically illustrated, and FIG. 2 and 3 are schematic illustrations of a check valve used in the rocket system of FIG. 1 showing the check valve in its "open" and "closed" positions, respectively.

DESCRIPTION OF THE PREFERRED EMBODIMENT

In FIG. 1 of the drawings, a solid propellant rocket motor system 1 includes a cylindrical case 10 having a nozzle 12 at the aft end thereof and a "Divert propulsion system" or maneuvering stage 14 at the forward end. Contained within the case 10 is a propulsive aft propellant grain 16 and a forward propulsive propellant grain 18. Aft propellant grain 16 is metallized, and hence, energetic. It is a high burn rate propellant. Forward propellant grain 18 may be a metallized propellant, and thus energetic, or unmetallized propellant, as desired.

Propellant grain 18 is spaced forwardly of and separated from propellant grain 16 by a rearwardly sloping wall 20. Attached to the aft end of wall 20 is a nozzle 22 that extends into an axial perforation 24 formed in the aft propellant grain 16. An axial perforation 26 in the forward propellant grain 18 communicates with the axial perforation 24 in the aft propellant grain 16.

Located within the forward propellant grain perforation 26 is a cylindrical auxiliary generator 28. Generator 28 has an axially positioned first outlet orifice 30 at the forward end thereof arranged in close communicating relation with an inlet 32 of the maneuvering stage 14. Axially positioned at the aft end of generator 28 is a second outlet orifice 33 initially sealed by a burst disk 34.

Positioned in the inlet 32 of the maneuvering stage 14 is a ball check valve 36. FIGS. 2 and 3 illustrate a typical check valve 36 that may be employed in the rocket system 1 of FIG. 1. In the open position shown in FIG. 2, gas under pressure from the gas generator 28 forces the ball 35 of check valve 36 to the left, as seen in the drawing, against a solid boss 37, allowing gas to flow around the outside of ball 35 to the thruster nozzles 38. When the maneuvering stage 14 is separated from the top or second stage 56 and pressure is being produced in the divert gas generators or propellant packages in the maneuvering stage 14, the ball 35 moves to the right, preventing gas flow to the right, and hence, out of the maneuvering stage through the check valve 36.

It is noted that, if desired, a spring 37a, indicated in dotted lines in FIG. 3, may be provided in addition to or in lieu of the solid boss 37 for moving the ball to right to close the check valve 36 in the absence of gas under pressure being applied from the gas generator 28 to the maneuvering stage 14.

The material of which the check valve 36 is made may be a ceramic or a carbon-carbon that is capable of withstanding high temperatures. Valve 36 operates responsively to the pressure of gas generated by generator 28 to allow gas to flow to control means comprising a plurality of thruster nozzles 38 in the maneuvering stage 14. Thruster nozzles 38 are suitably positioned as required to control pointing or steering, and hence direction of flight of the rocket system 10, and also of the maneuvering stage 14 alone upon separation of the latter from the remainder of the system, under control of command means or mechanism indicated by reference numeral 39 in the maneuvering stage 14. By suitable positioning of thruster nozzles 38, altitude and roll of the maneuvering stage 14 may also be controlled. Fast acting valves (not shown), as known in the art, individually associated with the thruster nozzles 38 and under control of the command mechanism 39 allow the generated gas to flow through selected ones of the thruster nozzles 38 to effect the commanded steering or other adjustment.

Command means 39 may be of a type known in the art suitably arranged to be responsive to both internally pre-programmed and externally received signals and also to signals produced by pressure responsive means (not shown) in response to pressure drops in the rocket motor lower stages occurring when the propulsive propellant therein has been consumed.

Also under control of the command mechanism 39 is an igniter 40 in the generator 28 for initiating the generation of gas therein. Contained within the maneuvering stage 14 for providing a gas source for the thruster nozzles 38 upon separation from the remainder of the system is propellant means comprising three propellant packages designated by the numerals 42, 44 and 46. If desired, a larger number or smaller number of such propellant packages may be provided.

A layer 48 of slow burning propellant indicated by the dotted line in the drawing is provided on the surface of the perforation 26 in the forward propellant grain 18. The layer 48 of slow burning propellant is so selected or characterized as to delay burning of the forward propellant grain 18 until after the aft propellant grain 16 has been consumed.

Case 10 is so formed that the portion thereof containing the aft propellant grain 16 and the aft positioned nozzle 12 may be separated from the remainder of the case 10 containing the forward propellant grain 18 when the aft propellant grain has been consumed. Such separation may be made to occur at a separation plane indicated by the reference numeral 50 and may be effected by means of explosive bolts indicated at 41 and activated under control of the command mechanism 39 provided in the maneuvering stage 14. Similarly, the maneuvering stage 14 may be separated from the forward end of case 12 at a separation plane indicated by the reference numeral 52. Such separation may also be effected by explosive bolts indicated at 43 under control of the command mechanism in the maneuvering stage 14. In each case the command mechanism operates to effect such separation responsively to the successive drops in pressure that occur in the rocket motor upon the burnout first of the aft propellant grain 16 and then of the forward propellant grain 18.

For facilitating an understanding of the invention, the portion of the rocket motor system containing the aft propellant grain 16, the associated portion of case 10, and the aft end nozzle 12 is designated by the reference numeral 54 and referred to herein as the bottom or first stage. The portion of the rocket motor system 1 containing the forward propellant grain 18, rearwardly sloping wall 20, nozzle 22, auxiliary gas generator 28 and propellant grain layer 48 are designated by the reference numeral 56 and referred to herein as the top or second stage.

OPERATION OF THE PREFERRED EMBODIMENT

Upon ignition of the gas generator 28 by activation of igniter 40, gas pressure is built up in generator 28. This pressure opens ball check valve 36 and allows gas to be supplied through inlet 32 of the maneuvering stage 14 to thruster nozzles 38 under control of the command mechanism 39 therein. The thrust produced by the thrust nozzles 38 is used to point the rocket motor system 1 at the target. This pointing capability exists before first stage ignition that is before ignition of the aft propellant grain 16 of the first stage 54.

Under command of the command mechanism 39 in the maneuvering stage 14, the thrust nozzles 38 are closed. Pressure builds up in generator 28 and bursts disk 34 allowing gas to flow through second outlet orifice 33 into axial perforation 26 of the second stage 56 and into axial perforation 24 of the first stage 54 of the rocket motor system 1. This ignites the aft propellant grain 14 and the slow burning propellant grain layer 48 on the surface of the forward propellant grain 18. It will be understood that, if desired, separate igniter means (not shown) may be used to ignite the aft propellant grain 16 and the layer 48 on slow burning propellant grain 18. Also, if desired, an explosive device (not shown) may be provided to burst the burst disk 34. Ignition of propellant grain 16 and propellant layer 48 causes a build up of gas pressure in the axial perforations 24 and 26 and a significantly large forward thrust producing flow of gas out of the aft nozzle 12 of the first stage 54 of the rocket system 1.

During operation of the first stage 54, the thrust nozzles 38 may be used as thrust vector control system, either for maintaining the pointing direction of the rocket system or changing the pointing direction as the target maneuvers.

In accordance with the invention, generator 28 is characterized in having an excess gas generating capacity. Such excess gas generating capacity may be achieved by providing more propellant in the generator than is required for the pointing, attitude and roll adjustments of the rocket system 1. Because of such excess generating capacity none of the gases produced by the first stage aft propellant grain 16, which, as previously mentioned, is energetic and corrosive, are allowed to flow through the ball check valve 36 to the thrust nozzles 38. Also, none of the gases produced by the propellant layer 48 or by the forward propellant grain 18 during operation of the second stage 56 of the rocket motor are allowed to flow through the ball check valve 36 to the thrust nozzles 38.

The aft propellant grain 16, which, as previously mentioned, is a high burn rate propellant, burns through before burn through of the layer 48 of slow burn propellant on the surface of perforation 26 in the forward propellant grain 18.

Upon burnout of the aft propellant grain 16, the pressure in the rocket motor drops. The stage 54 of the motor is then separated at the separation plane 50 on case 10 from the upper stages and jettisoned. Such separation is effected under control of the command mechanism 39 in the maneuvering stage 14 by the activation of explosive bolts 41. During this time the slow burning propellant layer 48 acts as a time delay mechanism, delaying the ignition of the forward propellant grain 18.

The vehicle comprising the rocket motor system 1 minus the first stage 54 coasts during the period of the time delay. During this period the thrust nozzles 38 can be supplied with gas from the gas generator 28 to change the pointing direction or to retarget the second stage during the coast maneuver.

Upon burn through of the layer 48 of the slow burn propellant 48, the forward propellant grain 18 of the second stage 56 is ignited and gas pressure in the rocket motor builds up again. The resulting flow of gas through the nozzle 22 gives the vehicle another significantly large forward thrust.

During burning of the second stage 56 the thruster nozzles 38 again can act, with generated gas from generator 28 selectively directed through them, as a thrust vector control system, either maintaining pointing direction or changing the velocity vector as the target maneuvers.

After burnout of the second stage 56, the pressure therein drops and the maneuvering stage 14 is separated from the second stage 56 of the rocket motor system 1. The propellant packages 42, 44 an 46 in the maneuvering section 14 are ignited with the maneuvering stage 14 continuing to coast to the target. During such coasting the propellant packages 42, 44 and 46 provide a source of gas for the thrust nozzles 38 for changing the direction of the maneuvering stage 14, as required, even moving sideways, if necessary, to close in on the target.

In another embodiment of the invention, the propellant packages 42, 44 and 46 in the maneuvering stage 14 may be dispensed with. In such embodiment gas from the gas generator 28 may be used to point the maneuvering stage 14 at the target. The maneuvering stage 14 would then be separated from the second stage 56 and the gas generator 28 and allowed to drift until closing maneuvers occur.

Thus, there has been provided an improved apparatus whereby a forward final maneuvering or homing section or stage of a rocket motor system may be used to provide pointing, ignition and control of the lower stages during rocket motor system operation, without using its own propellant. The source of gas used for control during all except final closing maneuvers is the separate auxiliary gas generator 28 located within the second stage 56 of the rocket motor system 1. The inert weight associated with the auxiliary gas generator 28 and the rocket motor second stage 56 is discarded at final separation. Also, the inert weight associated with the rocket motor first stage 54 is discarded upon burnout of that stage.

The improved apparatus is characterized in that the propellant grain for the second stage 56 of the rocket motor as well as the propellant grain for the first stage 54 may be metallized, and hence, comprise an energetic propellant.

Additionally, the improved apparatus provides thrust vector control on both the first and second stages during operation thereof and provides pointing capability before first stage ignition, between first and second stage operation, and after second stage burnout.

Further, the improved apparatus eliminates the need for nozzle thrust vector capability and significantly reduces the complexity of the rocket motor system while improving the overall mass fraction.

Subject matter disclosed but not claimed herein is disclosed in and is being claimed in the copending application of Victor Singer and Barry E. Kerrigan filed on even date herewith bearing Ser. No. 047760.

With this description of the invention in detail, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the scope of the appended claims.

What is claimed is:

1. A multi-stage rocket system including a rocket motor having a plurality of lower stages and a head end final maneuvering stage with each of said lower stages including a propulsive propellant, and with said final maneuvering stage being used to provide pointing, ignition, and control of said rocket system, said final maneuvering stage including a plurality of thruster nozzles and an inlet through which gas under pressure may flow to said thruster nozzles, and further including check valve means associated with said inlet to control the flow of gas therethrough, said check valve means allowing a flow of gas under pressure into said maneuvering stage through said inlet, but precluding a flow of gas under pressure outwardly thereof, a gas generator associated with one of said lower stages and having a first outlet orifice in communicating relation with said inlet for supplying generated gas under pressure to said thruster nozzles through said check valve means, said gas generator having a second outlet orifice which initially is sealed but which when opened allows generated gas under pressure to be delivered to said lower stages for igniting said stages, said gas generator having excess gas generating capacity whereby propulsive gases resulting from ignition of said lower stages is precluded from flowing through said check valve means.

2. A multi-stage rocket system as defined in claim 1 wherein said gas generator is located in the uppermost one of said lower stages.

3. A multi-stage rocket system as defined in claim 2 wherein said maneuvering stage is separable from said lower stages and includes propellant means for providing a gas source for said thruster nozzles upon such separation.

4. A multi-stage rocket system as defined in claim 2 wherein said lower stages includes at least a first stage and a second stage with the propulsive propellants of each of said first and second stages each having a perforation therein, which perforations are in axial alignment and through which generated gas under pressure is delivered upon opening of said second outlet orifice to effect ignition of the propulsive propellants of said first and second stages, and wherein the surface of the perforation in said second stage has a slow burning propellant layer thereon, which slow burning propellant is so characterized that upon delivery of generated gas under pressure through said perforations the first stage propulsive propellant is ignited and consumed before said second stage propellant is ignited.

5. A multi-stage rocket system as defined in claim 4 wherein the first stage propulsive propellant is a high burn rate propellant.

6. A multi-stage rocket system as defined in claim 5 wherein said first stage is separated from said second stage when the propulsive propellant thereof has been consumed.

7. A multi-stage rocket system as defined in claim 6 wherein said gas generator is located in the perforation in the propulsive propellant in said second stage.

8. A multi-stage rocket system as defined in claim 7 wherein said stage is separated from said maneuvering stage when the propulsive propellant thereof has been consumed.

9. A multi-stage rocket system as defined in claim 8 further including command means in said maneuvering stage, and wherein the said separation of each of said first and second stages is effected under control of said command means.

10. A multi-stage rocket system as defined in claim 9 further including:
a cylindrical case having a first portion containing said first stage and a second portion containing said second stage with said first portion being at the aft end of said cylindrical case and with said maneuvering stage being attached to said cylindrical case at the forward end thereof,
explosive bolt means arranged between said first and second cylindrical case portions for effecting the separation of said first stage from said second stage, and
explosive bolt means arranged between the forward end of said cylindrical case and said maneuvering stage for effecting the separation of said second stage from said maneuvering stage.

* * * * *